(12) United States Patent
Fisher

(10) Patent No.: US 8,673,989 B2
(45) Date of Patent: Mar. 18, 2014

(54) METHOD OF DEVULCANIZING A CROSS-LINKED ELASTOMERIC MATERIAL

(75) Inventor: James F. Fisher, Singhampton (CA)

(73) Assignee: New Rubber Technologies Holdings, Inc., San Rafael, CA (US)

( * ) Notice: Subject to any disclaimer, the term of this patent is extended or adjusted under 35 U.S.C. 154(b) by 174 days.

(21) Appl. No.: 13/304,509

(22) Filed: Nov. 25, 2011

(65) Prior Publication Data

US 2013/0137785 A1    May 30, 2013

(51) Int. Cl.
*C08J 11/04*    (2006.01)

(52) U.S. Cl.
USPC .................. 521/42; 521/40; 521/41; 521/43; 521/43.5; 435/130; 152/1; 152/151; 425/28.1; 425/40; 585/241

(58) Field of Classification Search
USPC ........ 521/40, 40.5, 41, 42, 42.5, 43, 43.5, 49; 152/1, 151; 435/130; 425/28.1, 40; 585/241
See application file for complete search history.

(56) References Cited

U.S. PATENT DOCUMENTS

| 5,510,419 A | 4/1996 | Burgoyne |
| 5,883,140 A | 3/1999 | Fisher |
| 7,461,970 B2 | 12/2008 | Brown |
| 2011/0301302 A1 | 12/2011 | Bohm et al. |

FOREIGN PATENT DOCUMENTS

| WO | WO03014206 A | 2/2003 |
| WO | 2012007949 | 1/2012 |

OTHER PUBLICATIONS

Hess et al ("Devulcanization as an Opportunity to Recycle Rubber", Chem. Listy 103, (2009), pp. s58-s60).*
Kamoun et al ("The Effect of Novel Binary Accelerator System in Properties of Vulcanized Natural Rubber", Advances in Materials Science and Engineering, vol. 2009, (2009), Article ID 916467, pp. 1-7).*
Evaluation of Waste Tire Devulcanization Technologies by CalRecovery Inc., Dec. 2004.

* cited by examiner

*Primary Examiner* — Frances Tischler
(74) *Attorney, Agent, or Firm* — Morrison & Foerster LLP

(57) ABSTRACT

A thermoset cross-linked elastomer material, such as scrap tire rubber, is devulcanized by subjecting the material to a mechanical mixing process in the presence of 0.5 to 2% by wt. of an organic catalyst having a thiol terminus.

8 Claims, 2 Drawing Sheets

| Cure Characteristics - MDR 6 min @ 170°C | | |
|---|---|---|
| Parameter | Control compound 65A natural rubber | Control compound plus 1% L-Cysteine |
| ML | 15.67 | 14.73 |
| MH | 27.88 | 27.37 |
| TS2 | 0.56 | 0.46 |
| TC50 | 1.1 | 0.58 |
| TC90 | 1.34 | 1.21 |

| Physical Properties - 20 min @ 150°C | | |
|---|---|---|
| Parameter | Control compound 65A natural rubber | Control compound plus 1% L-Cysteine |
| Tensile psi | 2328 | 2620 |
| Elongation % | 231 | 246 |
| Durometer A | 66 | 67 |

METHOD OF DEVULCANIZING A CROSS-LINKED ELASTOMERIC MATERIAL

FIELD OF THE INVENTION

This invention relates to the field of waste recycling, and in particular to a method of devulcanizing a cross-linked elastomer material, such as scrap from molding operations.

BACKGROUND OF THE INVENTION

Devulcanization is a method of recycling waste thermoset elastomeric material to produce a material that can be revulcanized into useful products. A thermoset elastomer results from a polymer that is irreversibly cured. Prior art processes for devulcanization use chemical, ultrasonic, biological with microorganisms, mechanical, microwave or steam techniques.

One such mechanical process known as high shear mixing (HSM) provides extremely high levels of shear and extensional stress, thereby inducing chemical reactions in the material being processed. U.S. Pat. No. 7,461,970, assigned to the applicant, describes such a process. It uses a mixing apparatus having two opposing mixing members rotatable relative to one another about an axis and that have facing surfaces which extend away from the axis to define a mixing chamber. An array of mixing formations on at least one of the surfaces acts to mix material and propel the material within the chamber toward the axis. This mechanical process has demonstrated the ability to un-crosslink thermoset elastomers using shear energy such that approximately 60% of the original physical properties of the materials are recovered.

Other mechanical processes include the step of adding chemicals to the material in the mixing chamber. However, these chemicals are extremely toxic and cause toxic gases to be emitted during the process. Today these processes are only used in countries where there are no controls on toxic emissions or enforceable regulations to protect the environment from such contamination.

WO 03/014206A1, assigned to the applicant describes a process for treatment of cross-linked elastomers such that a predetermined portion of the untreated material remains as vulcanized granules to thereby produce a flowable material comprising vulcanised elastomer dispersed in a matrix of devulcanized elastomer.

SUMMARY OF THE INVENTION

The inventors have found that the addition of a suitable catalyst with a thiol terminus to the mechanical process of high shear mixing has been shown to significantly improve the properties of materials recovered and approximately halve the processing time.

According to the present invention there is provided a method of devulcanizing a thermoset cross-linked elastomer material, comprising subjecting the material to a mechanical mixing process at a temperature of less than 80° C. in the presence of an amount of 0.5 to 2% by wt. of a biological catalyst having a thiol terminus.

By biological catalyst is meant a catalyst obtained from a biological source, such as hair. Amino acids with thiol groups represent a suitable biological source. A preferred catalyst is L-cysteine. The addition of such a catalyst can improve the properties by as much as 12.5% and reduce the processing time by 50%.

The amount of 0.5 to 2% by weight was selected as a range because this is the typical dosage of sulphur in a rubber compound, and the amount of biologicial catalyst was selected to match this dosage.

Biological catalysts are non-toxic, readily available and cost effective at the percentage and do not cause re-cure of the rubber without planned addition of rubber accelerators. They are effective at modest temperatures, <80° C., and preferably in the range 25-40° C. If the temperature of the devulcanization process exceeds about 80° C., the material may revulcanize, thus defeating the object of the devulcanization process.

BRIEF DESCRIPTION OF THE DRAWINGS

The invention will now be described in more detail, by way of example only, with reference to the accompanying drawings, in which.

DETAILED DESCRIPTION OF EMBODIMENTS OF THE INVENTION

Figures 1, 2:
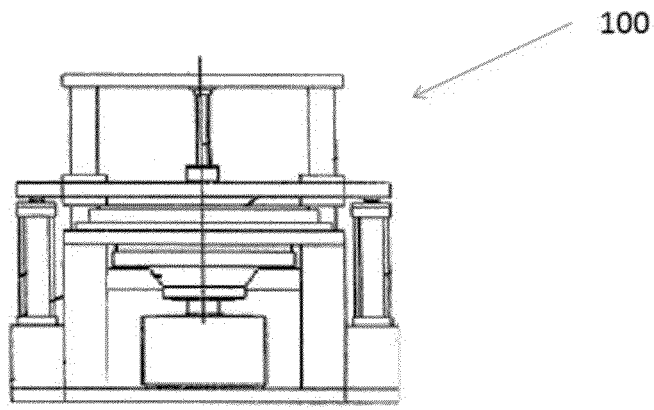
FIG. 1 is a schematic view of a high shear mixer.
FIG. 2 is a chart comparing physical and rheological properties of compounds.

FIG. 1 shows a high shear mixer (HSM) 100, of the type described in U.S. Pat No. 7,461,970. This device was used to demonstrate the invention.

A first process was conducted using a control compound, 65A Natural Rubber, and using an accepted HSM protocol and then post processed sufficiently to produce a compoundable masterbatch.

Sulphur and rubber accelerator were added to achieve a curable control compound. The physical and rheological properties of the control compound were then assessed using a moving die rheometer.

A second process was conducted using the same control compound under the identical HSM and compounding protocol as used in the said first process. However, 1% by weight of L-Cysteine material was pre-dispersed in the said control compound during the HSM process immediately before the final plasticization step. The process was controlled within the temperature range of 25° C.-80° C., the preferred temperature being 60° C.

A curable compoundable masterbatch was produced as a result. The same physical and rheological properties of said novel compoundable masterbatch were assessed to determine the effect of the addition of the catalyst—L-Cysteine.

FIG. 2 shows the comparative results. In FIG. 2, the identified parameters have the following meanings:
MDR—moving die rheometer
ML—minimum torque
MH—maximum torque
TS2—scorch time (time to 2 point rise in torque on rheometer curve)
T50—time to 50% of maximum cure MH
T90—time to 90% of maximum cure.

Overall, a 12.5% improvement in physical properties and a reduced process time of about 50% was achieved. The first process took about ten minutes to process a batch size of 1.5 Kg and the said second process took about five minutes to process the same batch size.

L-Cysteine is a naturally occurring amino acid and nutritional supplement. It is also used as an expectorant in medicine to liquefy mucous by breaking disulphide bonds in proteins. Since L-Cysteine is ingested by humans for medical purposes it is clearly non-toxic. Consequently, the use of L-Cysteine in an industrial process like devulcanization does not cause toxic emissions to be created by its use. Other generic homologues of cysteine may also be used as the catalyst in the process, including cystine, which is the product derived from the combination of two cysteine molecules to give an S-S bond.

Figure 3:
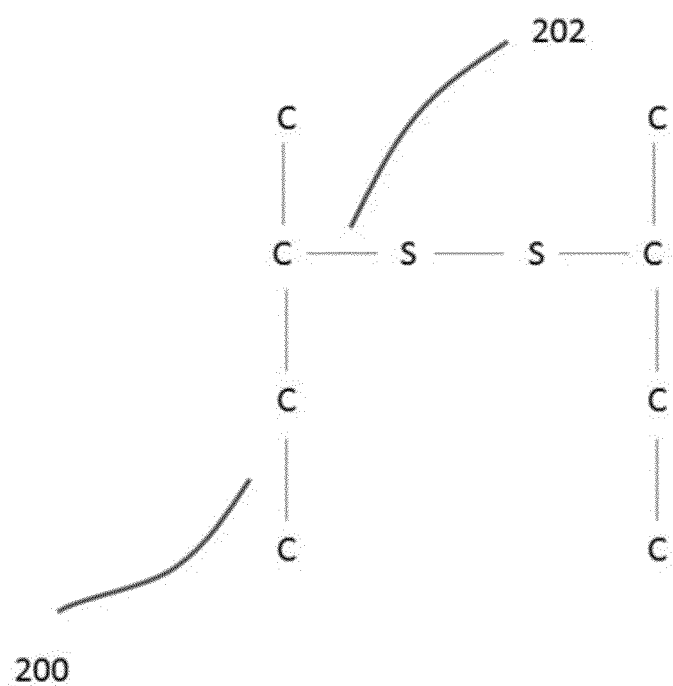
FIG. 3 is a schematic chemical structure of a cross-linked thermoset elastomer.

FIG. 3 illustrates the cross-linked chemical structure of a typical thermoset elastomer. Chains, 200, of carbon atoms C are cross-linked to each other by chemical bonds, or cross links 202, with sulphur elements S. By adding between 0.5% to 2%, the preferred embodiment being 1%, by weight of L-Cysteine to a natural rubber compound in the novel process the chemical bonds or cross links between the sulphur elements are targeted and weakened by the L-Cysteine. This causes more of these cross links to be selectively delinked, while the chemical bonds, or links, between the carbon elements are not weakened and remain strong. For this reason, the applicants believe that similar organic compounds with a thiol terminus will give the same or similar effects.

The mechanically applied shear energy severs more of the sulphur links 202 than carbon links thereby preserving more of the carbon chains 200. This in turn preserves more of the material's original properties and also allows the process to be completed in less time.

Also other biologically sourced organic chemicals that have thiol terminus—S—H can also be used as the catalyst in the process because they interact in a similar manner as L-cysteine through the thiol terminus and are inherently non toxic.

The process is useful for devulcanizing cross-linked thermoset elastomer material, such as scrap rubber from molding operations. This rubber has a high value. The devulcanizing process restores the rubber to a pre-vulcanized state, wherein it may be revulcanized into useful products. Scrap rubber wastage from molding operations can be re-used. The invention is also applicable to scrap rubber from tires, although this is subject to a number of other treatments and is generally not as suitable for full recycling.

All references are herein incorporated by reference.

I claim:

1. A method of devulcanizing a thermoset cross-linked elastomer material, comprising subjecting a batch of the material to a mechanical high shear mixing process in a high shear mixer at a temperature of less than 80° C. in the presence of an amount of 0.5 to 2% by wt. of a biological catalyst having a thiol terminus to restore the material to a pre-vulcanized state suitable for revulcanization into useful products.

2. The method as claimed in claim 1, wherein the biological catalyst is an amino acid.

3. The method as claimed in claim 1, wherein the catalyst is cysteine.

4. A method of devulcanizing a thermoset cross-linked elastomer material, comprising subjecting a batch of the material to a mechanical high shear mixing process in a high shear mixer at a temperature of less than 80° C. in the presence of an amount of 0.5 to 2% by L-ctysteine to restore the material to a pre-vulcanized state suitable for revulcanization into useful products.

5. The method as claimed in claim 3, comprising about 1% by wt. L-cysteine.

6. The method as claimed in claim 4, wherein the mixing process is carried out at temperature of about 60° C.

7. A method of devulcanizing a thermoset cross-linked elastomer material, comprising subjecting a batch of the material to a mechanical high shear mixing process in a high shear mixer at a temperature of less than 80° C. in the presence of an amount of 0.5 to 2% by wt. of cystine to restore the material to a pre-vulcanized state suitable for revulcanization into useful products.

8. The method as claimed in claim 1, wherein the cross-linked elastomer material is scrap rubber.

* * * * *